(12) United States Patent
Groppe et al.

(10) Patent No.: US 10,240,335 B2
(45) Date of Patent: Mar. 26, 2019

(54) SELF-DRAINING SUPPORT BEAM

(71) Applicants: Rudi Groppe, Gilroy, CA (US); Erick Davidson, Salinas, CA (US); Victor Vidauri, Gilroy, CA (US); Kristine L. Madison, Gilroy, CA (US)

(72) Inventors: Rudi Groppe, Gilroy, CA (US); Erick Davidson, Salinas, CA (US); Victor Vidauri, Gilroy, CA (US); Kristine L. Madison, Gilroy, CA (US)

(73) Assignee: Heinzen LLC., Gilroy, CA (US)

( * ) Notice: Subject to any disclaimer, the term of this patent is extended or adjusted under 35 U.S.C. 154(b) by 0 days.

(21) Appl. No.: 15/435,198

(22) Filed: Feb. 16, 2017

(65) Prior Publication Data

US 2017/0159281 A1   Jun. 8, 2017

Related U.S. Application Data

(63) Continuation-in-part of application No. 14/832,872, filed on Aug. 21, 2015, now Pat. No. 9,752,322.

(51) Int. Cl.
| | |
|---|---|
| *E04B 1/24* | (2006.01) |
| *E04C 3/09* | (2006.01) |
| *E04H 5/08* | (2006.01) |
| *E04C 3/04* | (2006.01) |
| *B23K 101/04* | (2006.01) |

(52) U.S. Cl.
CPC .............. *E04B 1/2403* (2013.01); *E04C 3/09* (2013.01); *E04H 5/08* (2013.01); *B23K 2101/04* (2018.08); *E04B 2001/2457* (2013.01); *E04B 2001/2472* (2013.01); *E04C 2003/0413* (2013.01); *E04C 2003/0465* (2013.01)

(58) Field of Classification Search
CPC ................ E04C 3/04; E04G 1/00; E04G 1/04
USPC ...... 52/843, 845, 716.2, 204.1, 204.2, 204.5, 52/209; 29/897.31, 897.312
See application file for complete search history.

(56) References Cited

U.S. PATENT DOCUMENTS

| | | | | |
|---|---|---|---|---|
| 2,678,488 A | * | 5/1954 | Erzer ....................... | E04C 3/06 29/897.35 |
| 2,959,256 A | * | 11/1960 | Deam ................... | E04B 1/2403 403/174 |
| 4,041,270 A | * | 8/1977 | Akahide ................ | B23K 9/188 219/137 R |
| 4,241,826 A | * | 12/1980 | Billington .............. | B65G 21/02 198/825 |

(Continued)

*Primary Examiner* — Joshua J Michener
*Assistant Examiner* — Matthew J Gitlin
(74) *Attorney, Agent, or Firm* — GSS Law Group

(57) ABSTRACT

A structural support beam having a top wall joined to a side wall at an angle substantially different from a right angle. When installed in a facility or machine with the side wall parallel to a vertical reference, no surface on the support beam is parallel to a horizontal reference, thereby providing for rapid and thorough draining of water deposited on any surface of the beam. Some beam embodiments place the top wall at an angle of about twenty degrees above a horizontal reference when the beam is installed. Alternatively, the top wall may be at an angle of about twenty degrees below the horizontal reference. Some beam embodiments have an open side. Alternatively, a bottom wall may be attached to a side wall to form a tubular support beam. A support beam may include a lower beam joined to an upper beam by a connector bar.

7 Claims, 16 Drawing Sheets

(56) References Cited

U.S. PATENT DOCUMENTS

| | | | | |
|---|---|---|---|---|
| 4,314,132 A | * | 2/1982 | Porter | B23K 9/23 |
| | | | | 219/137 R |
| 4,970,833 A | * | 11/1990 | Porter | E04B 1/24 |
| | | | | 403/171 |
| 5,326,187 A | * | 7/1994 | St. Marie | E04F 11/1836 |
| | | | | 256/66 |
| 5,881,508 A | * | 3/1999 | Irvine | E01C 5/20 |
| | | | | 405/219 |
| 6,296,111 B1 | * | 10/2001 | Mekanik | B65G 21/06 |
| | | | | 198/836.3 |
| 7,257,932 B2 | * | 8/2007 | Ng | E04C 3/07 |
| | | | | 138/168 |
| 2004/0093825 A1 | * | 5/2004 | Lee | E04B 1/24 |
| | | | | 52/843 |

\* cited by examiner

SELF-DRAINING SUPPORT BEAM

FIELD OF THE INVENTION

Embodiments of the invention are generally related to structural support beams, and more particularly to support beams for constructing facilities and equipment related to food processing.

BACKGROUND

Food processing facilities and machinery may be washed with water to remove dirt and sanitize equipment. However, horizontal surfaces on a structure or machine may retain sufficient water to support the growth of bacteria, mold, yeast, or other potential pathogens. Pathogens in standing water have been identified as a potential source of food contamination.

Metal support beams used in the construction of food processing facilities and machinery may be formed as channels, for example I-beams, C-beams, U-beams, rectangular or square tubes, or other shapes with at least one flat surface. When a support beam with a flat surface is assembled into a structure or machine, the flat surface may be positioned horizontally, possibly providing a location for accumulation of standing water. Some beams have enclosed spaces that can trap sufficient water to support the growth of pathogens. For example, water used to wash an elevated platform may be trapped inside the central void of a hollow round or rectangular beam used for a handrail, equipment stand, or safety barrier. When beams are joined together with a flat surface on one of the beams in contact with a flat surface on the other beam, sufficient water may be retained in small gaps between connected surfaces to support the growth of pathogens. The gaps between surfaces may be very difficult to clean.

Efforts have been made to arrange support beams in a structure so that no surface on any beam exposed to washing is horizontal. For example, a square or rectangular tubular beam may be rotated about an axis parallel to the beam's longitudinal dimension, tilting surfaces on the beam away from a horizontal plane. The tilted surfaces of the beam prevent the accumulation of standing water on the beam. However, tilting the surfaces of the beam away from horizontal and vertical planes may reduce the load-carrying capacity of the beam, possibly increasing a number of beams needed to form a safe, stable structure. Increasing the number of support beams raises the cost of the structure and increases the number of surfaces that need to be washed to prevent the growth of pathogens.

SUMMARY

An example of a support beam includes a first side wall; a first self-draining wall joined to the first side wall at a first interior angle substantially different from a right angle; a second self-draining wall joined to the first self-draining wall; and a second side wall joined to the second self-draining wall at a second angle substantially different from a right angle, with the second side wall parallel to the first side wall. The first side wall, the first self-draining wall, the second self-draining wall, and the second side wall form a channel with an open side opposite the first and second self-draining walls.

The first interior angle and/or the second interior angle may optionally be greater than ninety degrees (90°).

The first interior angle and/or the second interior angle may optionally be in a range from one hundred degrees (100°) to one hundred thirty five degrees (135°). In some embodiments of the support beam, the first interior angle and/or the second interior angle may be approximately equal to one hundred ten degrees (110°).

The example of a support beam may include an installed position with the first and second side walls parallel to a vertical reference, the first self-draining wall at an angle of approximately twenty degrees (20°) to a horizontal reference, and the second self-draining wall at an angle of approximately twenty degrees (20°) to the horizontal reference.

In some embodiments of the support beam, the first interior angle and/or the second interior angle of the example support beam embodiment are less than ninety degrees (90°). The first interior angle and/or the second interior angle may optionally be in a range from forty five degrees (45°) to eighty degrees (80°).

The first interior angle and/or the second interior angle may optionally be approximately equal to seventy degrees (70°).

In some embodiments of a support beam, the first self-draining wall and the first side wall are joined by a first longitudinal bend, the first self-draining wall and the second self-draining wall are joined by a second longitudinal bend, and the second self-draining wall and the second side wall are joined by a third longitudinal bend. Alternatively, the first self-draining wall and the second self-draining wall are joined by a first longitudinal weld, the first self-draining wall and the first side wall are joined by a second longitudinal weld, and the second self-draining wall and the second side wall are joined by a third longitudinal weld.

An alternative example of a support beam embodiment includes a channel having a side wall, a top wall joined to the side wall at a first interior angle, and a bottom wall joined to the side wall opposite the top wall; and a second of the channel. The top wall of the channel is joined to the top wall of the second channel by a first longitudinal weld; the bottom wall of the channel is joined to the bottom wall of the second channel by a second longitudinal weld; the first interior angle is in a range from forty five degrees to eighty degrees; and the second interior angle is in a range from forty five degrees to eighty degrees. The side wall and the top wall of the channel are joined by a first longitudinal bend and the side wall and the bottom wall of the channel are joined by a second longitudinal bend. Alternatively, the side wall and the top wall of the channel are joined by a first longitudinal weld and the side wall and the bottom wall of the channel are joined by a second longitudinal weld.

Another example embodiment of a support beam includes a support beam assembly, comprising a first self-draining support beam, the first self-draining support beam including a first side wall; a first self-draining wall joined to the first side wall at a first interior angle substantially different from a right angle; a second self-draining wall joined to the first self-draining wall; and a second side wall joined to the second self-draining wall at a second angle substantially different from a right angle, the second side wall parallel to said first side wall; and a second of the self-draining support beam joined to the first self-draining support beam by a connector bar joined to the first and second side walls of the first self-draining support beam, the connector bar passing through apertures formed in the first and second side walls of the second self-draining support beam. An open side of the first self-draining support beam may face a corresponding open side of the second self-draining support beam.

This section summarizes examples of some features of the disclosed embodiments. These and other features, aspects, and advantages of the embodiments of the invention will become better understood with regard to the following description and upon reference to the drawings.

DESCRIPTION

Embodiments of a support beam include two self-draining walls attached to side walls to form a structural support member having no horizontal surfaces, joints, seams, gaps, or voids capable of accumulating standing liquid. Support beam embodiments may be used as load-bearing structural supports in facilities and machinery subjected to washing with water, disinfectant, soap, and/or other liquids, for example facilities and machinery associated with food handling and processing. All surfaces on a support beam embodiment may be positioned for thorough washing and draining to prevent the accumulation of dirt and pathogens that may lead to food contamination. Beam embodiments may be joined to one another without forming reservoirs for standing water.

A support beam embodiment includes a side wall joined to a self-draining wall at an angle substantially different than a right angle. Embodiments of the support beam are preferably positioned in a building, machine, or other structure with the side walls of the support beam parallel to a vertical plane. When the support beam is installed with the side walls in a vertical plane, the self-draining walls of the support beam will each be at a substantial angle to a horizontal reference, preventing liquid from accumulating on any of the walls and surfaces of the beam. Liquid deposited on the support beam quickly and thoroughly drains away from the side walls and self-draining walls. Any remaining thin film of liquid adhering to wetted surfaces may evaporate too quickly to serve as a fluid reservoir that can support the growth of pathogens.

U.S. patent application Ser. No. 14/832,872, titled "Tubular Support Beam With Self-Draining Surface", filed Aug. 21, 2015, discloses support beams formed with closed, tubular cross sections, in comparison to many of the embodiments disclosed herein having an open side. U.S. patent application Ser. No. 14/832,872 is incorporated herein by reference in its entirety.

Embodiments of the support beam are advantageous for use in food processing facilities, where standing water on a surface of a machine or structure is preferably avoided to reduce a risk of food contamination from pathogens in the water. Because the side walls are preferably positioned parallel to a vertical plane, a support beam embodiment may have greater load-bearing capacity than a comparably-sized rectangular or square tubular beam rotated with the flat faces of the tubular beam tilted away from a horizontal plane to avoid water accumulation. A load-bearing structure subjected to washing may be made with fewer support beam embodiments than a structure made with previously known beams, reducing the installed cost of the structure and further reducing an amount of time needed to sanitize the structure.

Figure 1:
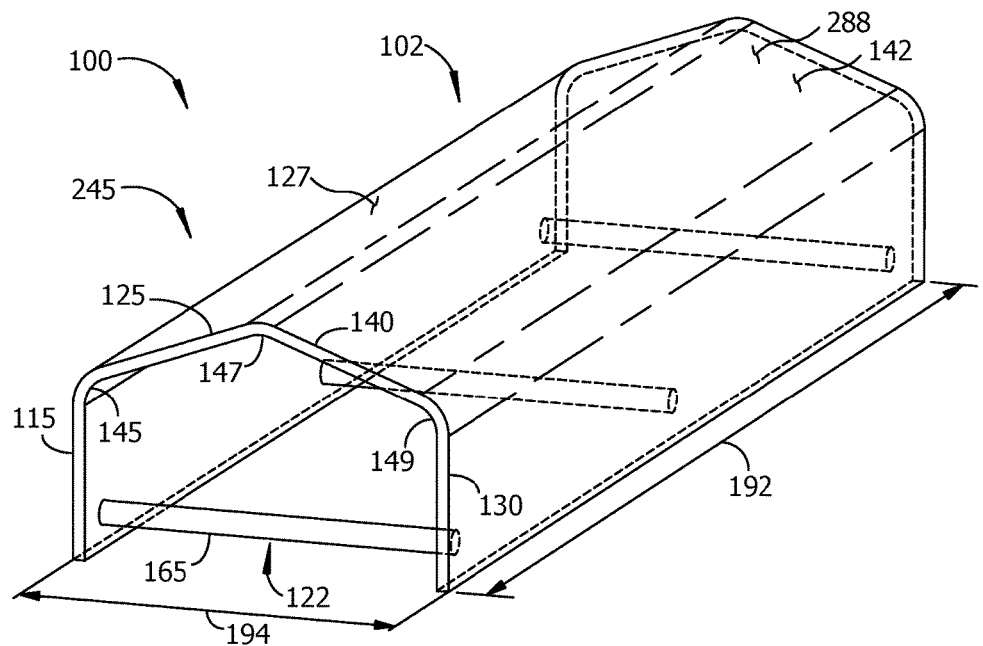
FIG. 1 shows a pictorial view toward an end, side wall, and self-draining wall of an example of a support beam embodiment formed by bending a metal plate or strip into a channel having an open side.

A pictorial view of an example support beam embodiment 100 appears in FIG. 1. The example support beam 100 may be formed with a closed side 102 and an open side 122. The closed side 102 includes a first self-draining wall 125 joined to a second self-draining wall 140. An exterior surface of the first self-draining wall 125 corresponds to a first self-draining surface 127 in some embodiments. In other embodiments, the support beam 100 of FIG. 1 may be positioned with the open side 122 facing upward instead of downward as in FIG. 1 and an interior surface of the first self-draining wall 125 acting as a self-draining surface. An exterior surface of the second self-draining wall 140 corresponds to a second self-draining surface 142. A first channel side wall 115 joins to the first self-draining wall 125 along a side of the first self-draining wall opposite a side joined to the second self-draining wall 140. A second channel side wall 130 separated laterally from the first channel side wall 115 joins to the second self-draining wall 140 along a side of the second self-draining wall opposite the first self-draining wall 125.

An optional spreader 165 may join to the first channel side wall 115 and to the second channel side wall 130. In some embodiments of a support beam 100, more than one optional spreader 165 joins to the first and second channel side walls. A number and location of spreaders 165 may be included to limit the deflection of the beam 100 under load. Spreaders 165 may be joined to side walls (115, 130) by threaded fasteners, rivets, retaining pins, retaining clips, adhesive, or welding.

An exterior width dimension 194 for the example support beam 100 may be measured from an edge of an outside surface of the first channel side wall 115 to an edge of an outside surface of the second channel side wall 130. The example support beam 100 of FIG. 1 may be formed with any practical length dimension 192 and width dimension 194 by fabrication methods such as, but not limited to, bending a strip or sheet of ductile stock in a brake, extrusion, welding individually shaped pieces, casting, extrusion, bonding individually shaped pieces with adhesive, fusion, milling or machining, roll forming, air bending, and so on. A support beam embodiment 100 may be produced in a continuous length by roll forming, extrusion, or the like, or may be made in a batch process such as bending a selected length of flat stock on a brake, casting, welding, and so on. The length dimension 192 in the example of FIG. 1 further represents an example of a longitudinal direction for the embodiments described herein. The width dimension 194 further represents an example of a lateral direction.

Figure 2:
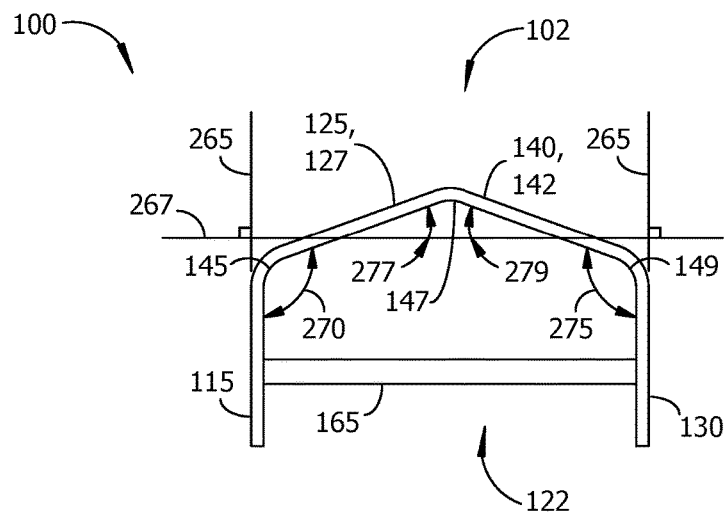
FIG. 2 shows an end view of the example support beam of FIG. 1.

FIG. 2 shows an end view of the example support beam embodiment 100 of FIG. 1. When the support beam embodiment 100 is installed in a structure or machine which may be exposed to liquid water, the first and second side walls (115, 130) are preferably approximately parallel to a vertical reference 265. As used herein, two walls, surfaces, or directions are approximately parallel when the magnitude of an acute angle between the two is less than two degrees. A surface is considered to be approximately horizontal when liquid in excess of an amount capable of forming a very thin surface film does not drain from the surface from the force of gravity. Standing liquid on a surface may indicate that the surface is approximately horizontal. A vertical reference 265 is parallel to the direction of earth's gravity. A horizontal reference 267 is perpendicular to the vertical reference 265.

In the example of FIGS. 1-2, the support beam 100 is shown with the first and second channel side walls parallel to a vertical reference 265, the open side 122 facing downward, and the closed side 102 facing upward, an example of an installed position 245 of the support beam. An alternative installed position 245 positions the support beam 100 with the closed side 102 facing downward and the open side 102 facing upward as suggested in the example of the lower beam 298 in FIGS. 24-26.

Continuing with the example support beam embodiment 100 of FIG. 2, the first channel side wall 115 joins to the first self-draining wall 125 at a first interior angle 270. The second channel side wall 130 joins to the second self-draining wall 140 at a second interior angle 275. For all the embodiments disclosed herein, the first interior angle 270 and second interior angle 275 are substantially different from a right angle (90°). As used herein, two angles are substantially different from one another when a magnitude of difference between the angles is at least ten degrees (10°). Two angles are approximately equal to one another when the two angles differ in magnitude by less than two degrees (2°).

In the example of FIG. 1, the first interior angle 270 and the second interior angle 275 are preferably greater than ninety degrees (90°). The first interior angle 270 and second interior angle 275 may optionally be in a range from one hundred degrees (100°) to one hundred thirty five degrees (135°).

An angle between a self-draining wall and a horizontal reference is related to the first and second interior angles (270, 275). An angle 277 between a horizontal reference 267 and the first self-draining wall 125 may optionally be in a range from ten degrees (10°) to forty five degrees (45°). In some support beam embodiments, the angle 277 is approximately equal to twenty degrees (20°), where "approximately" used in reference to an angular value corresponds to an angular tolerance of +/−2°. Another angle 279 between the horizontal reference 267 and the second self-draining wall 140 may optionally be in a range from ten degrees (10°) to forty five degrees (45°). In some support beam embodiments, the angle 279 is approximately equal to twenty degrees (20°). In some support beam embodiments, the two angles (277, 279) are not equal to one another. In some support beam embodiments, the first and second interior angles (270, 275) are not equal to one another.

Figure 3:
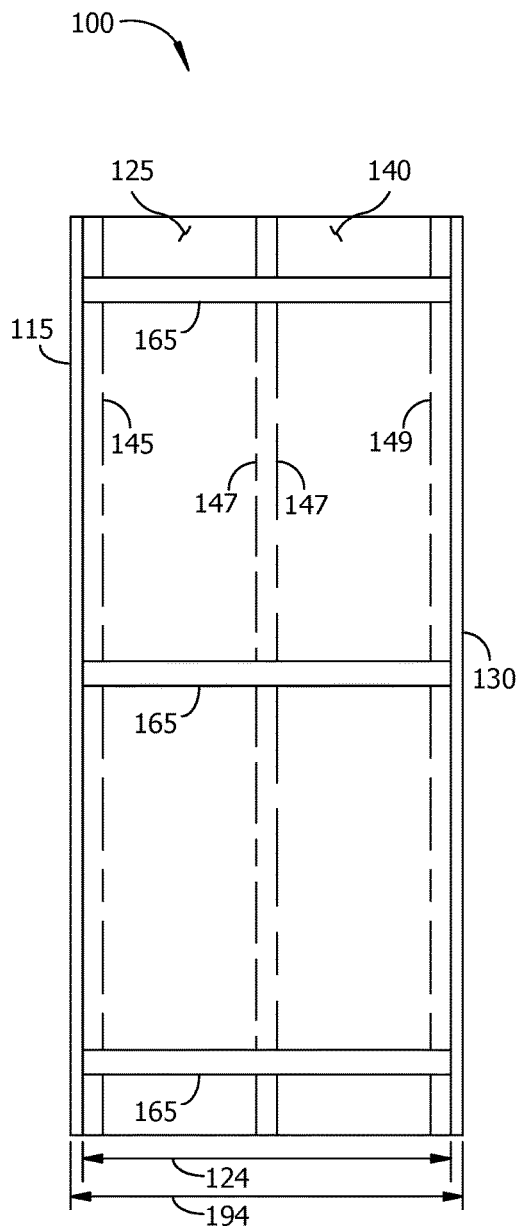
FIG. 3 shows a view toward the open side of the example support beam of FIGS. 1-2.
Figure 4:
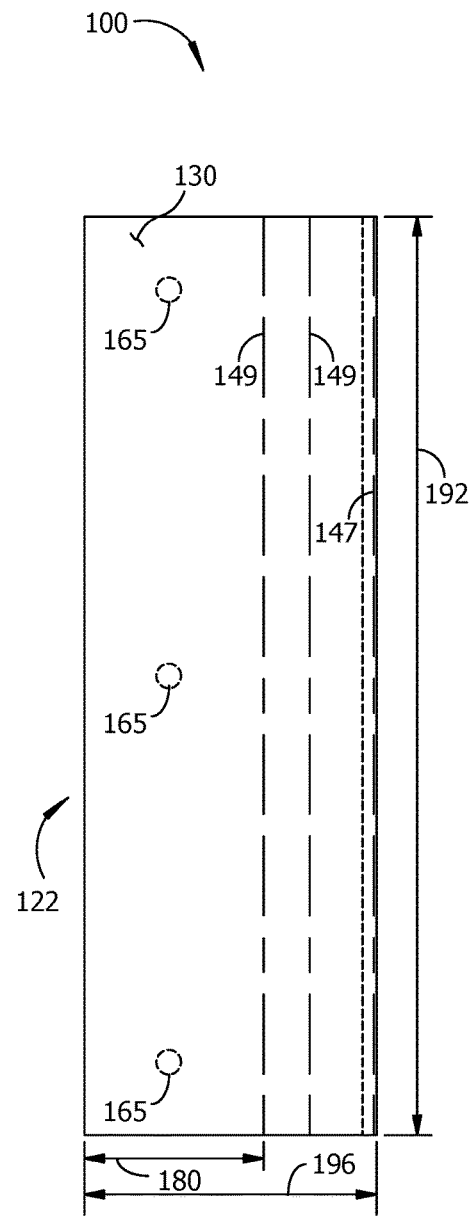
FIG. 4 shows a view toward a side wall of the example support beam of FIGS. 1-3.

The example support beam 100 of FIGS. 1-2 is shown toward the open side of the beam in FIG. 3 and toward a side wall in FIG. 4. As suggested in FIG. 3, more than one spreader 165 may be firmly attached to the side walls (115, 130). FIG. 3 and FIG. 4 shows examples of linear dimensions for a height 180 of a side wall 130, a height 196 of the beam 100, the exterior width 194 of the beam 100, the interior separation distance 124 between the first and second channel side walls (115, 130), and a length 192 of the beam 100. In the example of FIGS. 3-4, the support beam 100 includes three spreaders 165 distributed along its length 192. A support beam may alternatively include a different number of spreaders 165, omit spreaders altogether, or space spreaders at different separation distances than suggested in the figures. The example spreaders 165 shown in the figures are cylindrical. Spreaders may alternatively have other shapes, such as rectangular, square, and other polygonal or curved shapes. In some embodiments, spreaders are solid bars or rods. Spreaders may alternatively be hollow for any part of their length.

In the examples of FIGS. 1-4, the first self-draining wall 125 joins to the first channel side wall 115 along a first longitudinal bend 145. The first self-draining wall joins to the second self-draining wall 140 along a second longitudinal bend 147. The second self-draining wall 140 joins to the second channel side wall 130 along a third longitudinal bend 149. In alternative embodiments, the self-draining walls and channel side walls may be formed as separate pieces and joined to one another by welding, fasteners, fusing, or adhesive.

Figure 5:
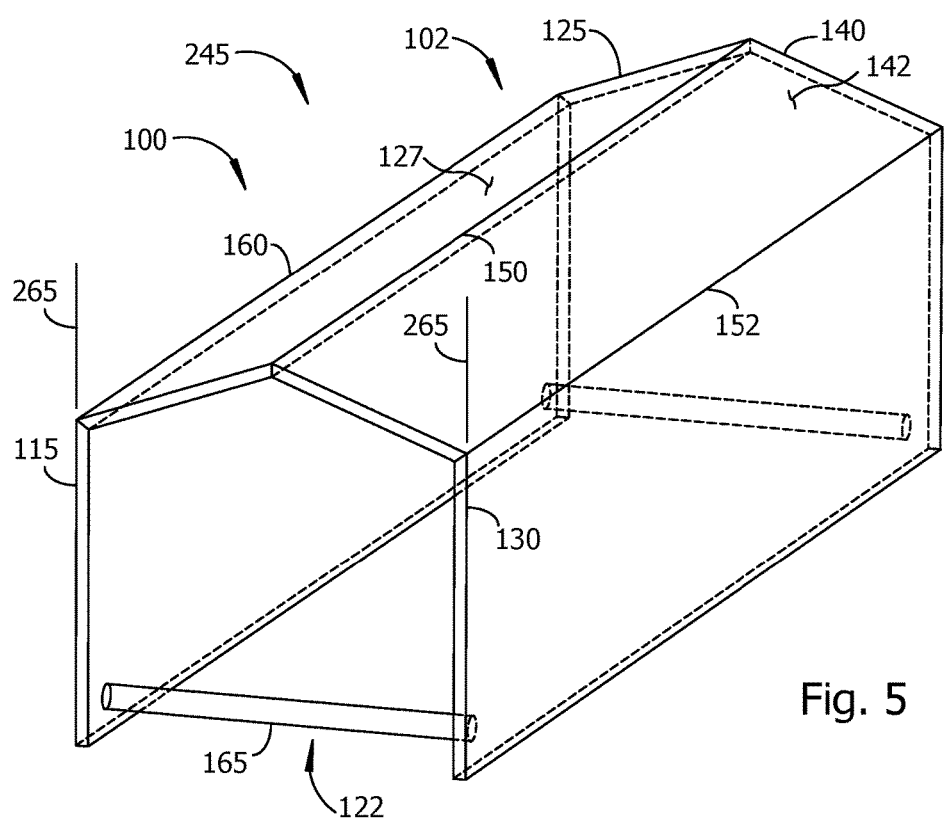
FIG. 5 is a pictorial view of an alternative embodiment of a support beam having side walls and self-draining walls formed as separate pieces and attached to one another to form a channel with an open side.
Figure 6:
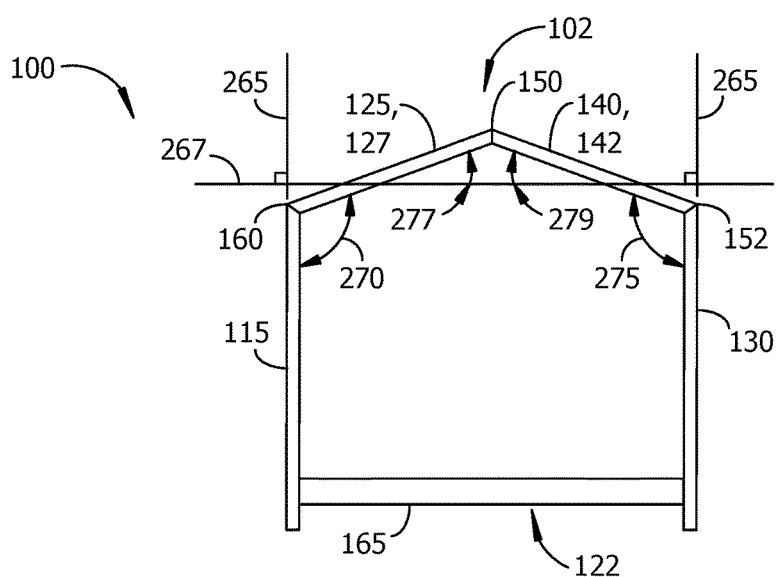
FIG. 6 is an end view of the example support beam of FIG. 5.

FIG. 5 shows a pictorial view of an example support beam 100 comprising walls formed as separate parts before being joined together. FIG. 6 shows an end view of the example support beam 100 of FIG. 5. The example support beam 100 includes a first channel side wall 115 joined to a first self-draining wall 125 along a first longitudinal weld joint 160. The first self-draining wall 125 is joined to the second self-draining wall 140 along a second longitudinal weld joint 150. The second self-draining wall 140 is joined to the second channel side wall 130 along a third longitudinal weld joint 152. The first and second angles (270, 275) and angles (277, 279) between the top walls and the horizontal reference 267 may be as previously described for the example of FIG. 2.

FIG. 5 illustrates another example of an installed position 245 of embodiments of a support beam 100. When installed in a facility or machine subject to washing with water, a support beam embodiment 100 is preferably arranged with the side walls (115, 130) parallel to a vertical reference 265 so that water will drain quickly and thoroughly from the side walls, the first and second self-draining walls (125, 140), and the first and second self-draining surfaces (127, 142).

In the examples of FIGS. 1-5, the apex of the closed side 102 extends outward from the side walls (115, 130), with the second longitudinal bend 147, or alternatively the second longitudinal weld 150, extending upward beyond the tops of the side walls (115, 130). In some alternative embodiments, each of the self-draining walls (125, 140) are disposed at an acute angle substantially less than ninety degrees (90°) relative to the adjacent channel side wall so that the self-draining walls form a valley or trough between the side walls.

Figure 7:
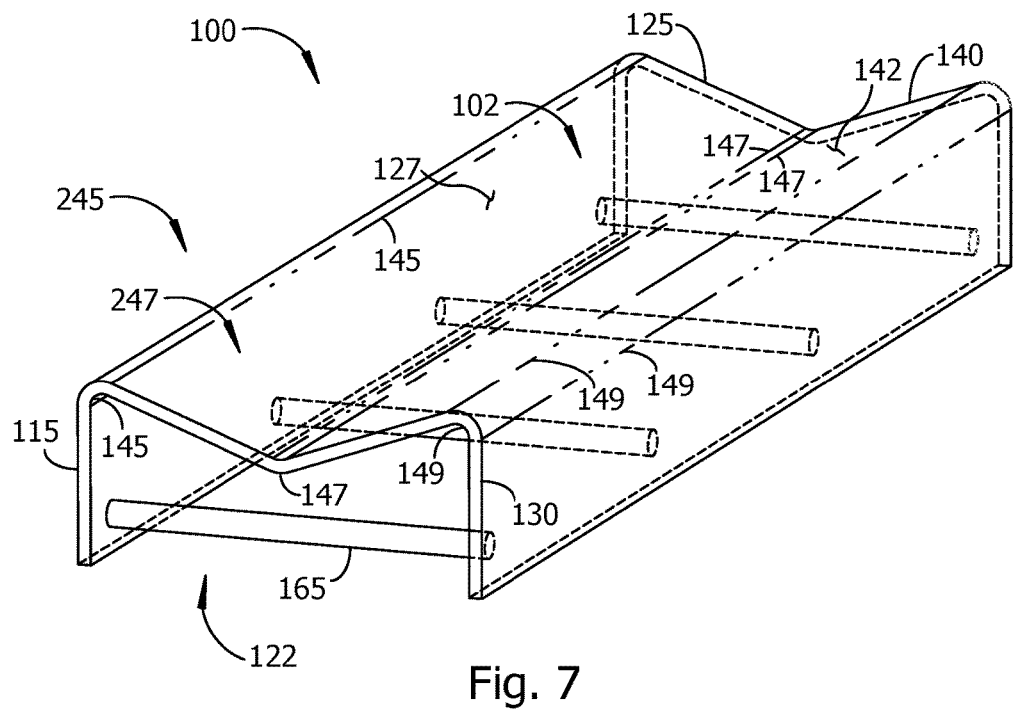
FIG. 7 shows a pictorial view toward an end, side wall, and self-draining wall of another example of an alternative support beam embodiment formed by bending a metal plate or strip into a channel having an open side.
Figure 8:
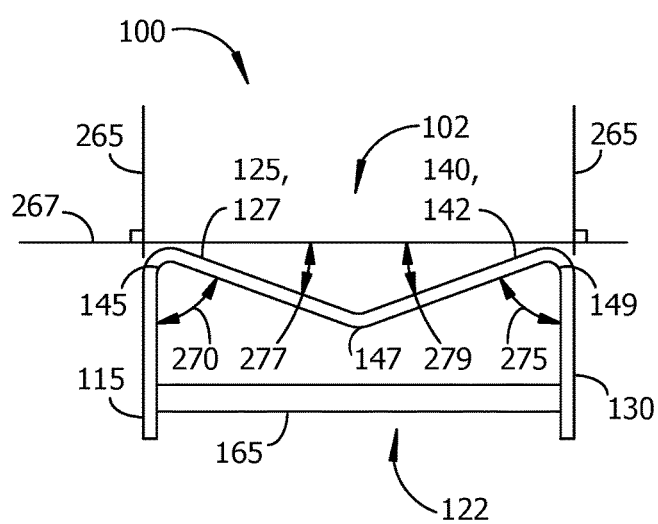
FIG. 8 shows an end view of the example support beam of FIG. 7.

FIG. 7 shows a pictorial view of an example of a support beam embodiment 100 with the self-draining walls (125, 140) forming a trough 247 between the side walls. FIG. 8 shows an end view of the example support beam 100 from FIG. 7. As for the previous examples, the top walls (125, 140) are joined to one another and to the channel side walls (115, 130) to form a support beam 100 with a closed side 102 and an open side 122, and the top walls are joined to the side walls at an angle that differs substantially from a right angle. Unlike support beams in some other figures, the top walls in the example support beam 100 of FIG. 7 are joined to the side channel walls at an angle that is substantially less than ninety degrees (90°). For example, the first interior angle 270 between the first channel side wall 115 and the first self-draining wall 125 may optionally be in a range from forty five degrees (45°) to eight degrees (80°). The second interior angle 275 between the second channel side wall 130 and the second self-draining wall 140 may optionally be in a range from forty five degrees (45°) to eight degrees (80°). In some embodiments, the first and second interior angles (270, 275) are approximately seventy degrees (70°).

As with other embodiments of the support beam 100, an angle 277 between the horizontal reference 267 and the first self-draining wall 125 in the example of FIGS. 7-8 may optionally be in a range from ten degrees (10°) to forty five degrees (45°). In some support beam embodiments, the angle 277 is approximately equal to twenty degrees (20°). Another angle 279 between the horizontal reference 267 and the second self-draining wall 140 may optionally be in a range from ten degrees (10°) to forty five degrees (45°). In some support beam embodiments, the angle 279 is approximately equal to twenty degrees (20°). In some embodiments, the interior angle 270 between a channel side wall 115 and its adjacent self-draining wall 125 is approximately equal to one hundred ten degrees (110°). The second interior angle 275 may be equal to the first interior angle 270.

Figure 9:
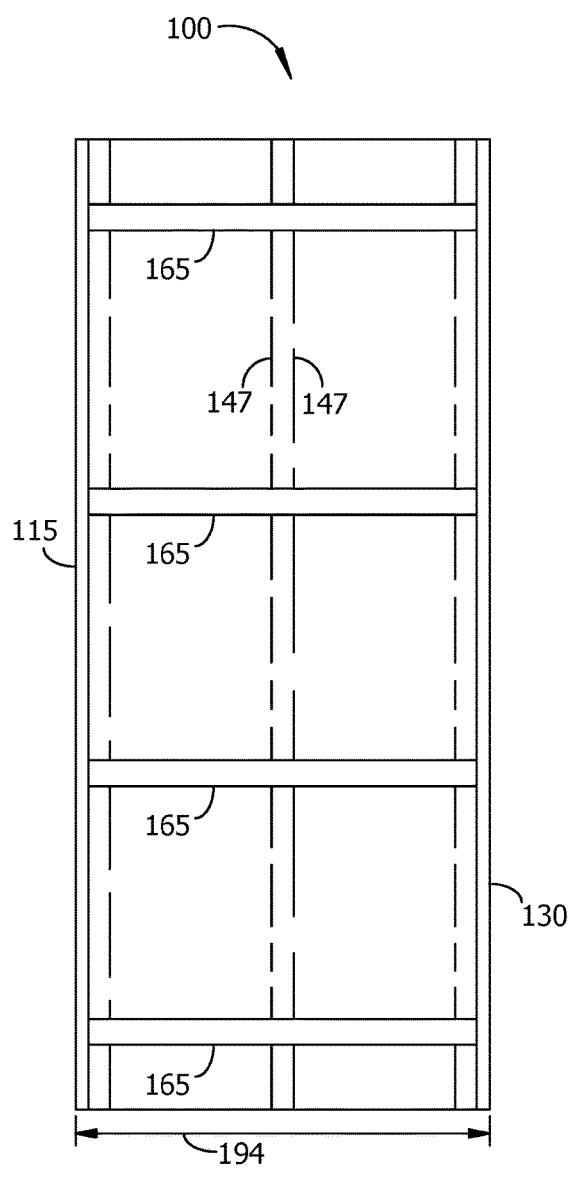
FIG. 9 shows a view toward the open side of the example support beam of FIGS. 7-8.
Figure 10:
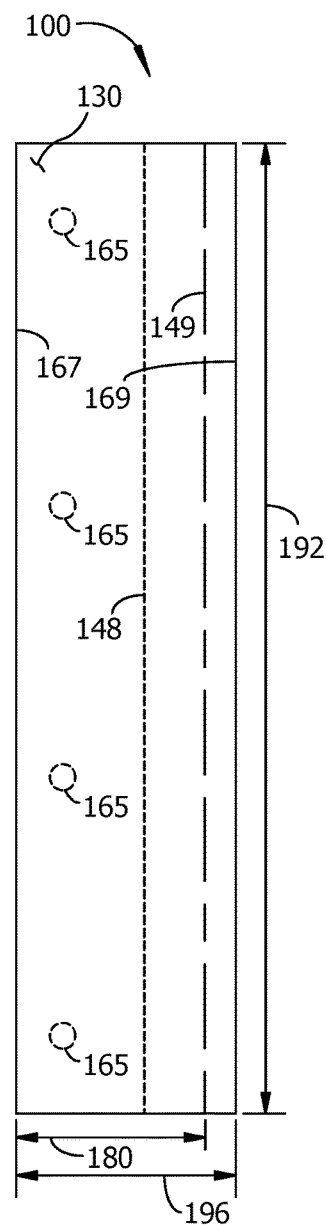
FIG. 10 shows a view toward a side wall of the example support beam of FIGS. 7-9.

FIG. 9 illustrates a view toward the open side 122 of the example support beam 100 of FIGS. 7-8, showing examples of positions for the optional spreaders 165. FIG. 10 illustrates a view toward the second channel side 130, showing an example of the bottom 148 of the second longitudinal bend 147.

Figure 11:
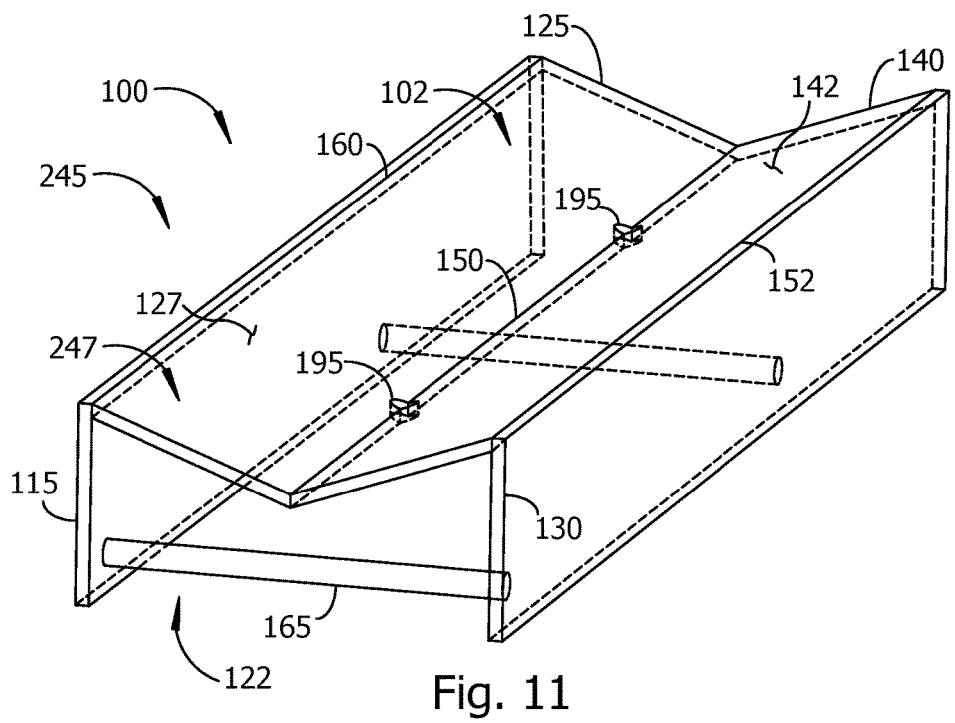
FIG. 11 is a pictorial view of another alternative embodiment of a support beam having side walls and self-draining walls formed as separate pieces and attached to one another to form a channel with an open side.
Figure 12:
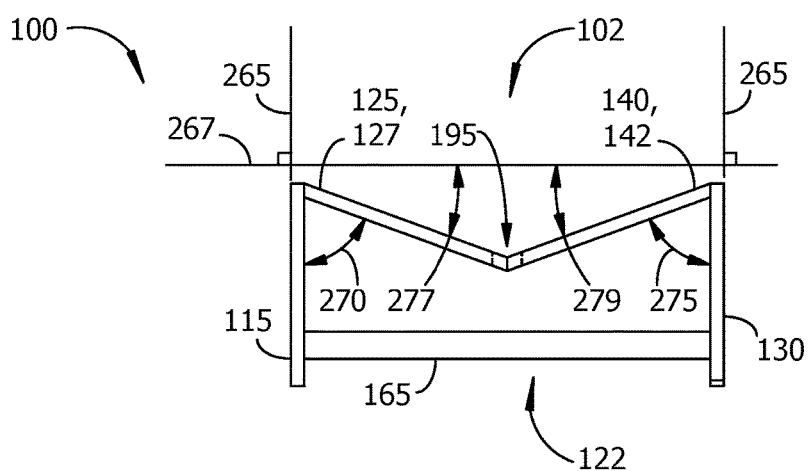
FIG. 12 is an end view of the example support beam of FIG. 11.

FIG. 11 shows a pictorial view of another example support beam 100 comprising walls formed from flat plates joined together. FIG. 12 shows an end view of the example support beam 100 of FIG. 11. The example support beam 100 includes a first channel side wall 115 joined to a first self-draining wall 125 along a first longitudinal weld joint 160. The example support beam embodiment 100 has an open side 122 opposite the closed side 102. The first self-draining wall 125 is joined to the second self-draining wall 140 along a second longitudinal weld joint 150. The second self-draining wall 140 is joined to the second channel side wall 130 along a third longitudinal weld joint 152. The first and second interior angles (270, 275) and angles (277, 279) between the top walls and the horizontal reference 267 are as previously described for the example of FIG. 8.

FIG. 11 further illustrates an example of a support beam embodiment with a drain hole through the closed side 102. One or more optional drain holes 195 may be formed as through-holes. Drain holes may optionally be placed along the bottom of the trough formed between the first and second self-draining walls (125, 142), or elsewhere on the closed side 102. A drain hole 195 may decrease an amount of time needed to remove water from the closed side 102 of a support beam embodiment 100, especially for beams extending over long horizontal distances. Any of the embodiments of a support beam 100 disclosed herein may be formed with at least one drain hole.

Figure 13:
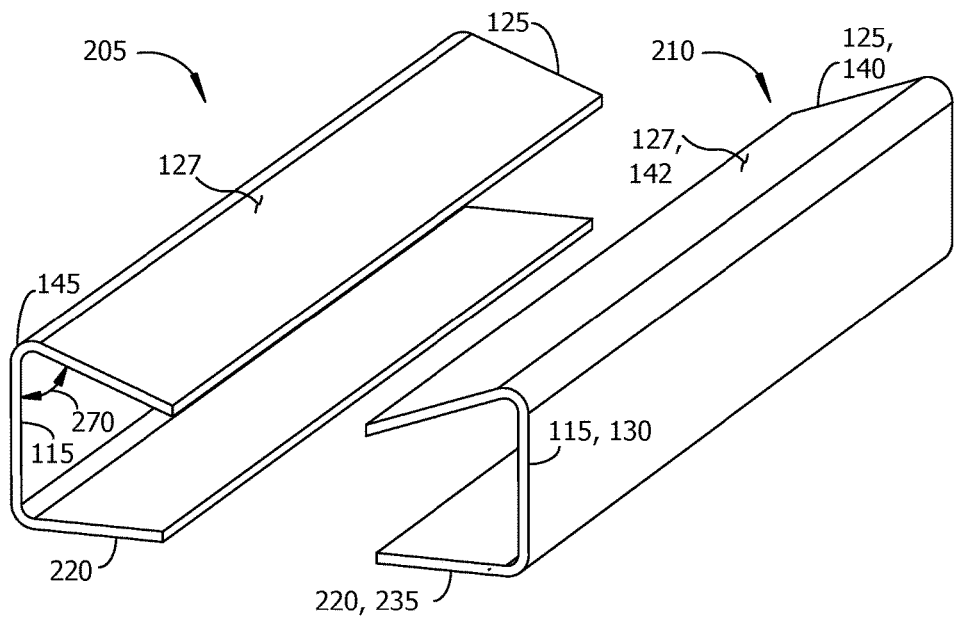
FIG. 13 shows a pictorial view of two separate lengths of a channel which may be joined to one another to form an embodiment of a support beam.

An embodiment of a support beam may be formed from two open-sided channels joined together, as in the examples of FIGS. 13-17. FIG. 13 shows a pictorial view of a first channel 205 having a self-draining surface 127 joined at an angle to a side channel wall 115. The side channel wall may be joined to an optional bottom wall 220. A second channel 210 may optionally have the same linear and angular dimensions as the first channel 205. In the example of FIG. 13, the second channel 210 is shown reversed end-for-end compared to the first channel 205, and the two channels are identical to one another.

Figure 14:
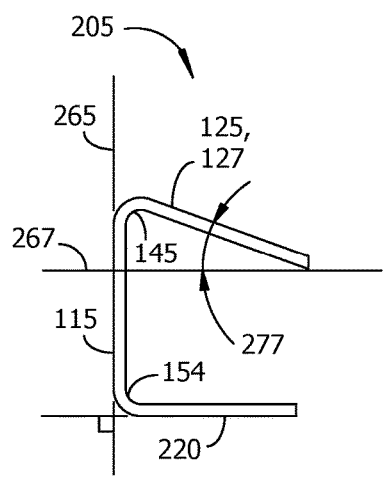
FIG. 14 is an end view of the example of a channel from FIG. 13.
Figure 15:
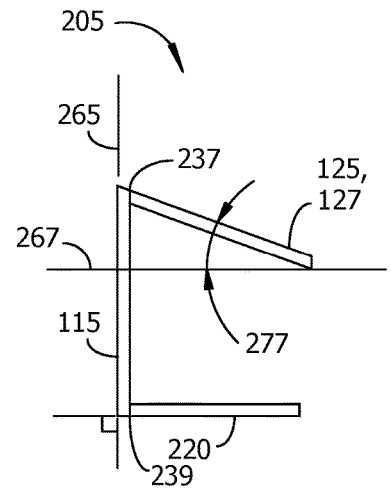
FIG. 15 is an end view of an alternative example of a channel having walls formed as separate pieces and attached to one another.

Alternative end views of an example channel 205 are shown in FIGS. 14-15. In the example of FIG. 14, the self-draining wall 125 joins to the channel side wall 115 along a first longitudinal bend 145. The optional bottom wall 220 joins to the channel side wall 115 along a second longitudinal bend 154. In the example of FIG. 15, the self-draining wall 125 joins to the channel side wall 115 along a first longitudinal weld 237 and the optional bottom wall 220 joins to the channel side wall along a second longitudinal weld 239. An angle 277 between the self-draining wall 125 and the horizontal reference 267 may be as previously described for the examples of FIG. 8 and FIG. 12.

For the second channel 210, the self-draining wall 140 corresponds to the self-draining wall 125 of the first channel 205, the side channel wall 130 corresponds to the side channel wall 115 of the first channel, and the bottom wall 235 corresponds to the bottom wall 220 of the first channel.

Figure 16:
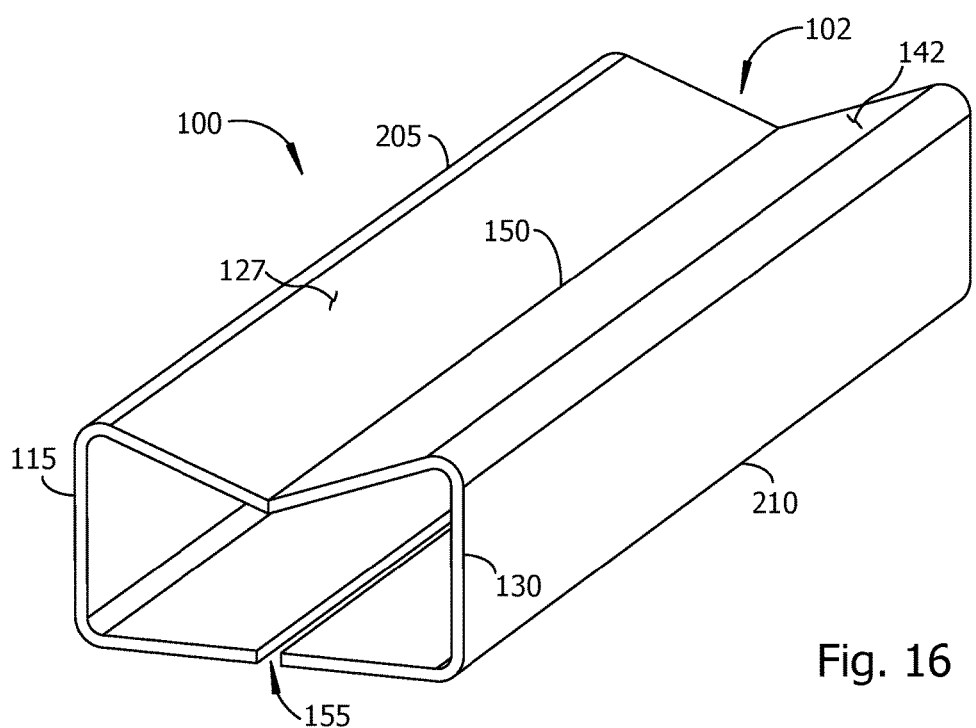
FIG. 16 is a pictorial view of another alternative embodiment of a support beam formed from the channels of FIGS. 13-14.
Figure 17:
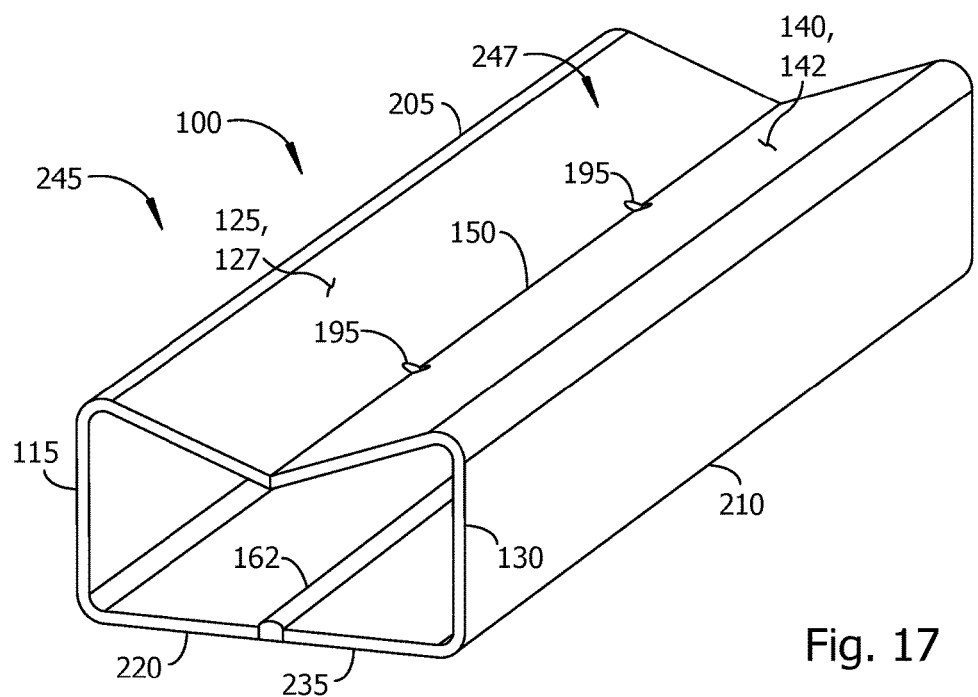
FIG. 17 continues the example of FIG. 16, showing the two bottom walls joined to one another by a longitudinal weld in a root gap.

The top walls (125, 140) of each of the two channels (205, 210) are shown joined to one another in FIGS. 16-17 by a longitudinal weld 150 to form the closed side 102 of the support beam 100. The closed side 102 includes the two self-draining surfaces (127, 142) formed into a trough 247. The width dimensions of the top walls (127, 142) and bottom walls (220, 235) may be specified to leave a root gap 155 between the opposing edges of the bottom walls. As shown in the example of FIG. 17, the root gap 155 may be filled with a weld 162 joining the bottom walls (220, 235) to one another. The closed side 102 may be formed with one or more optional drain holes 195 along the second longitudinal weld 150.

A support beam may be formed with self-draining flanges. An example beam embodiment 100 with two self-draining flanges 282 is shown in an end view in FIG. 18. A view toward the open side 122 of the example beam 100 is shown in FIG. 19. Flanges 282 are positioned longitudinally along the open side 122 of the beam 100 at the ends of the first 115 and second 130 channel side walls. A width across the flanges 283 may be measured from a longitudinal outer edge of one of the flanges 282 to the outer longitudinal edge of the flange on the other side of the beam. Each flange may be formed with an interior angle 284 between the flange and a side wall (115, 130) of the beam that matches the first interior angle 270. In an alternative embodiment, the angle of the flange 270 and the first interior angle 270 differ from one another. The interior angle 284 between the flange and the adjacent side wall may be in a range from one hundred degrees (100°) to one hundred thirty five degrees (135°). For example, the interior angle 284 may be 110°, tilting the top surface of the flange at an angle of 20° to a horizontal reference such as the floor of a building. Self-draining flanges 282 may be formed on other beam embodiments 100, for example beams 100 in FIGS. 1, 5, 7, and 11.

Figure 20:
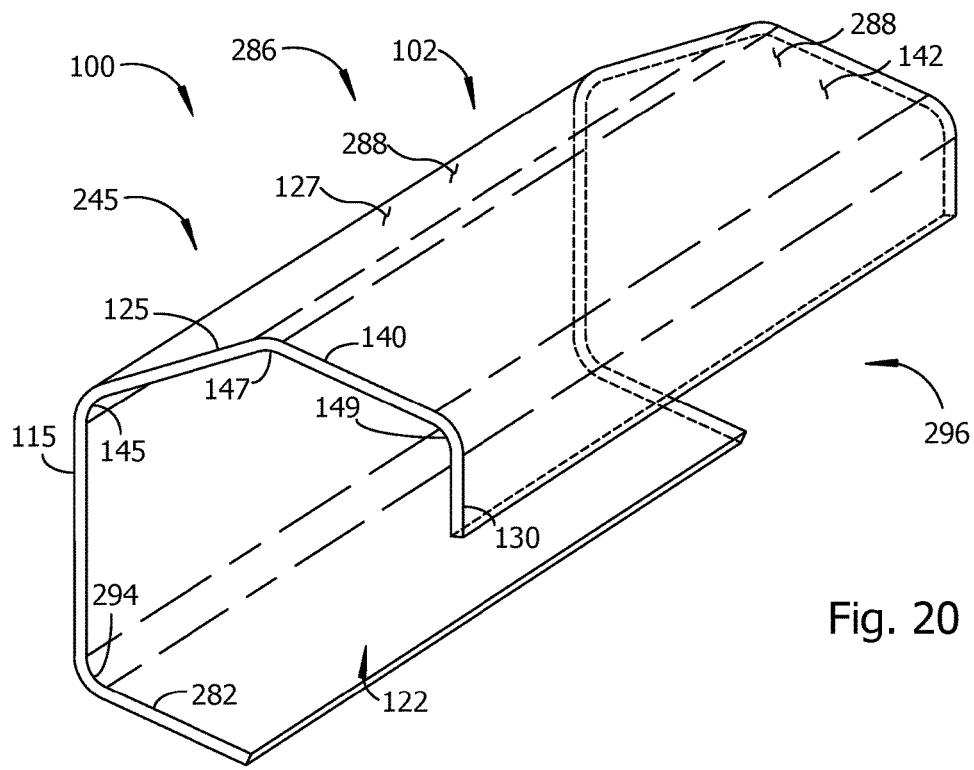
FIG. 20 is a pictorial view toward the upper exterior surfaces of an example of a flanged beam configured for use as a handrail.
Figure 21:
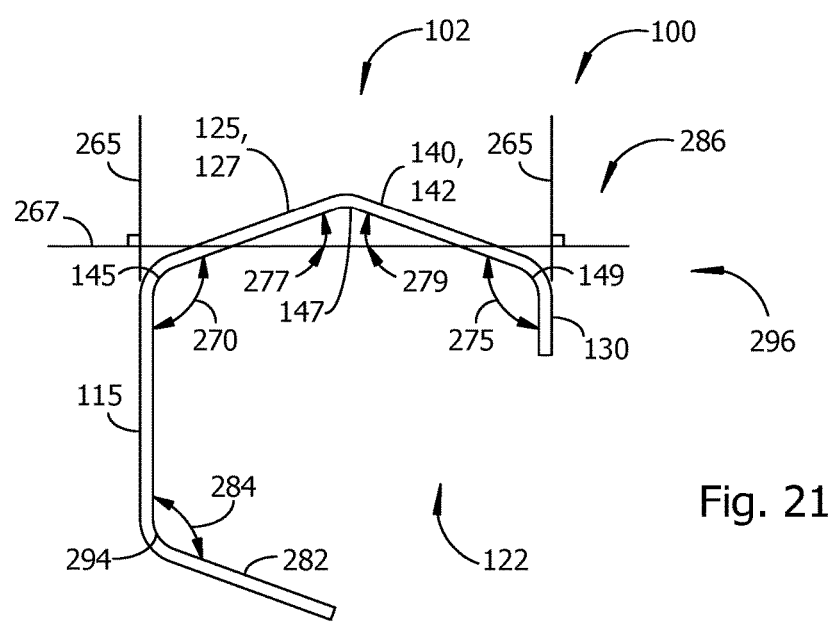
FIG. 21 is a view toward an end of the handrail example of FIG. 20.
Figure 22:
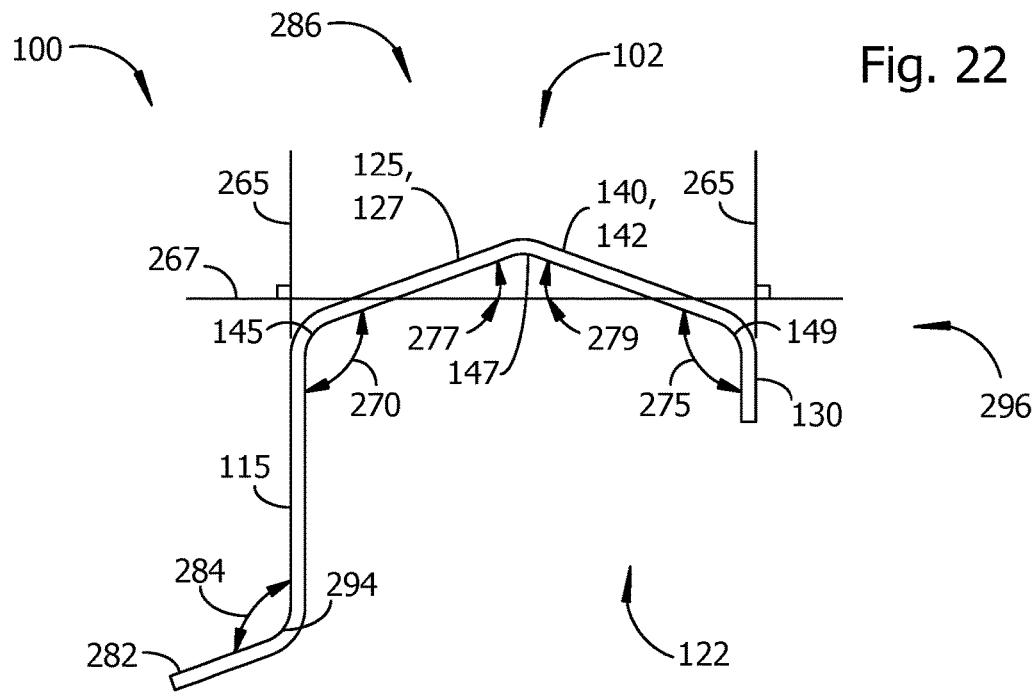
FIG. 22 is a view toward an end of an alternative embodiment of a flanged beam configured for use as a handrail.

An embodiment of a support beam 100 having a flange 282 may be given a size and shape adapted for use as a handrail 286 as suggested in the examples of FIGS. 20, 21, and 22. The example of a flanged beam 296 may be installed in a stairway or along a walkway with the first channel side wall 115 in a vertical plane as suggested for the example of an installed position 245 in FIG. 20. The second channel side wall 130 may optionally be shorter than the first channel side wall 115, leaving an open side 122 between the second channel side wall and flange 282. The first and second self-draining surfaces (127, 142) on the first and second self-draining walls (125, 140) form an upper exterior surface 288 suitable for gripping with a hand. An optional flange (not illustrated) may extend from the second channel side wall 130, similar to the flange extending from the first channel side wall 115. Labeling for angles, sides, and bends for the example handrail 286 follow corresponding features on the example beams 100 in FIGS. 1, 2, 18, and other figures.

In the example flanged beam 296 of FIGS. 20 and 21, the flange 282 bends toward the second channel side wall 130. The inside angle 284 of the fourth longitudinal bend 294 between the first channel side wall 115 and the flange 282 may be in a range from about 105° to about 135°. In the example of an alternative embodiment of the flanged beam 296 shown in FIG. 22, the flange 282 may bend away from the second channel side wall 130.

Figure 18:
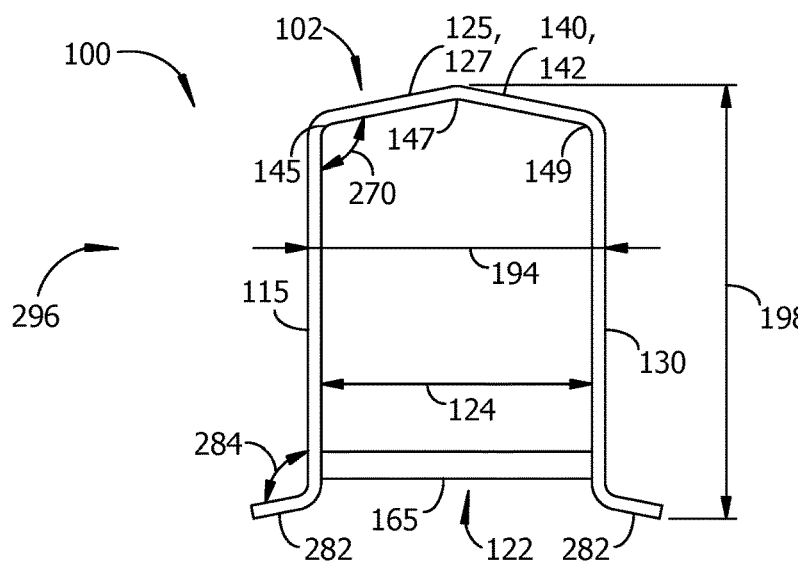
FIG. 18 is an end view of an example support beam having self-draining longitudinal flanges along the open side of the beam.
Figure 19:
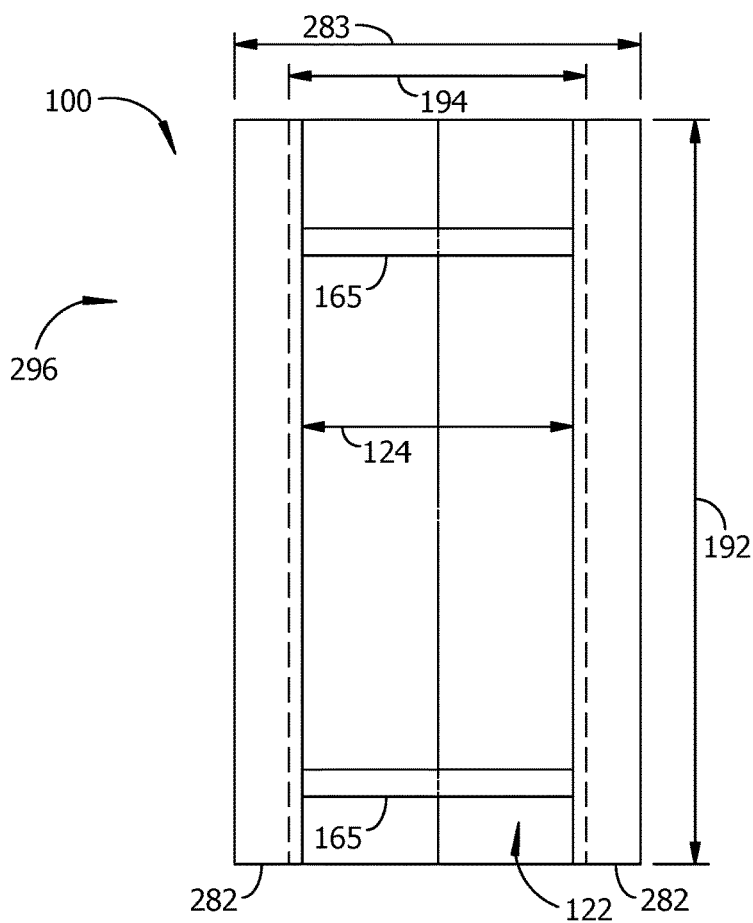
FIG. 19 is a view through the open side and toward the inside of the example of a flanged beam of FIG. 18.
Figure 23:
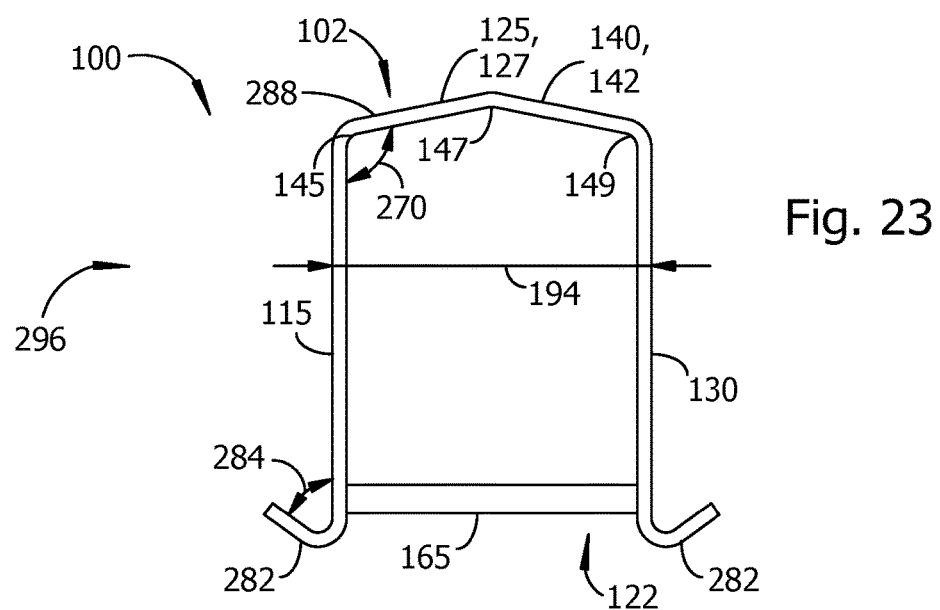
FIG. 23 is a view toward an end of an alternative embodiment of an example of a support beam having longitudinal flanges along the open side of the beam.

In the example of a flanged beam 296 shown in FIG. 18, the flanges 282 bend away from the closed side 102 of the example handrail beam 286. The inside angle 284 between a channel side wall (115, 130) and its attached flange 282 may be an obtuse angle as suggested in the example of FIG. 18. In an example of an alternative embodiment 100 of a flanged beam 296 shown in an end view in FIG. 23, one, or optionally both, of flanges 282 may bend toward the closed side 102 and the angle 284 between a channel side wall (115, 130) and its attached flange 282 may be an acute angle.

Figure 24:
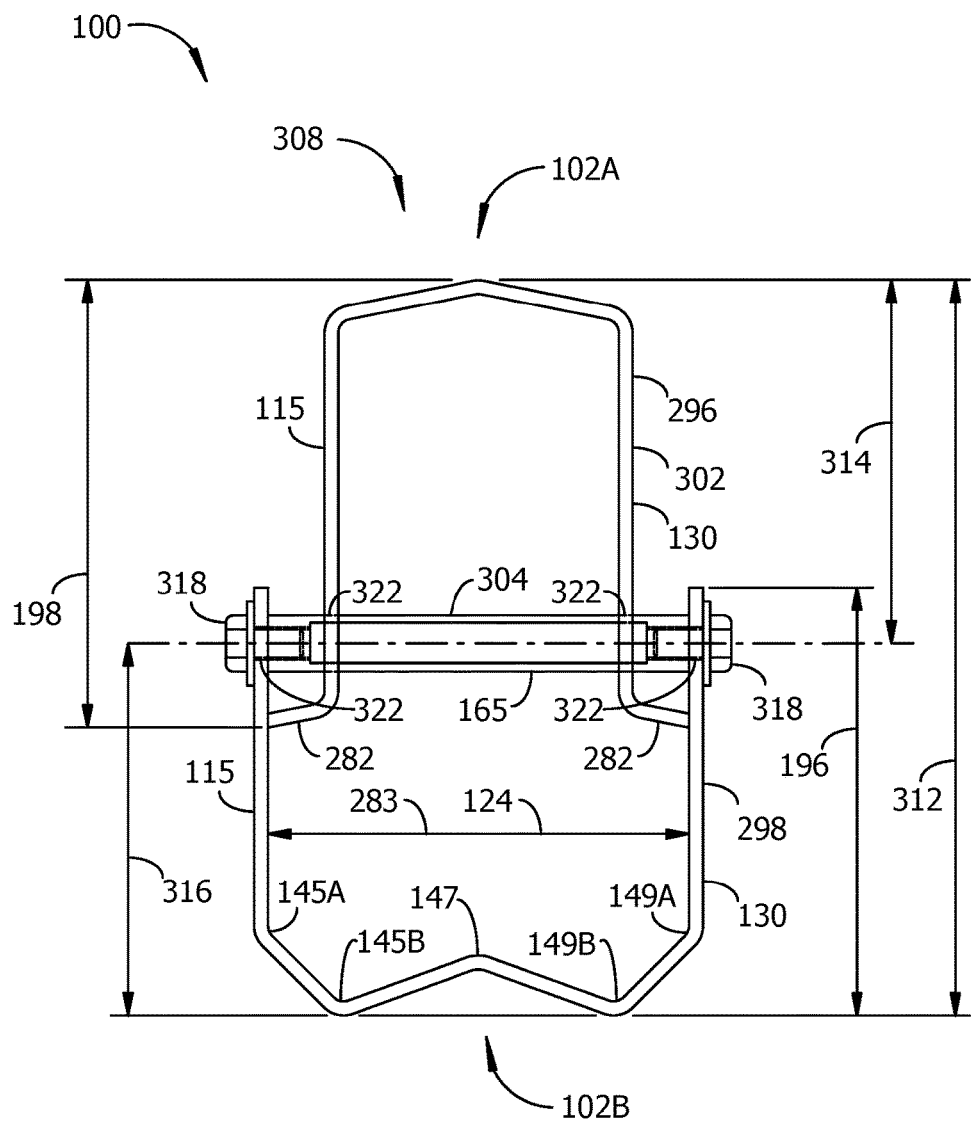
FIG. 24 is a view toward an end of an example of an embodiment of a support beam including a beam assembly having an upper support beam joined to a lower support beam.

An embodiment of a support beam 100 may have an upper beam joined to a lower beam to form a self-draining support beam assembly with a configurable height dimension. A configurable height dimension may be advantageous for forming a beam assembly with a desired degree of stiffness to resist deflection under load. FIG. 24 is an end view of an example of a beam assembly 308 having a configurable height dimension 312 measured from the closed side 102A of an upper beam 302 to the closed side 102B of a lower beam 298. In the example of FIG. 24, the upper beam 302 may be a self-draining flanged beam 296 comparable to the examples of flanged beams 296 in FIGS. 18 and 23, or a flanged beam based on the support beam examples in FIG. 7 and FIG. 11. The lower beam 298 may be a self-draining support beam configured as shown in the examples of FIGS. 1, 5, 7, and 11, with the beam rotated such that the closed side 102B faces downward and the open side 122 faces upward.

Figure 25:
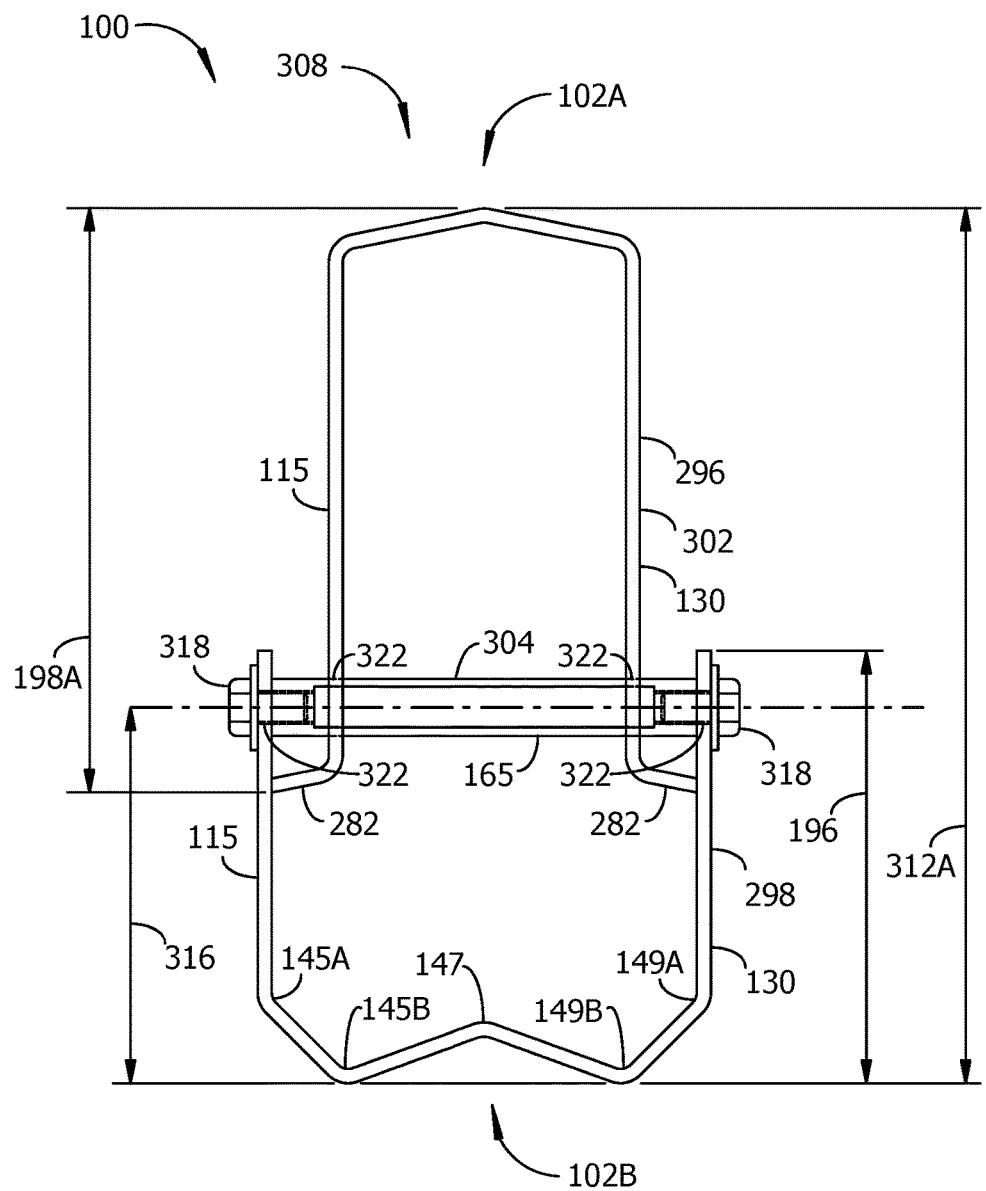
FIG. 25 is an example of an alternative embodiment of a beam assembly wherein a height of one of the beams has been increased compared to the example of FIG. 24 to form a beam assembly with a larger profile height.
Figure 26:
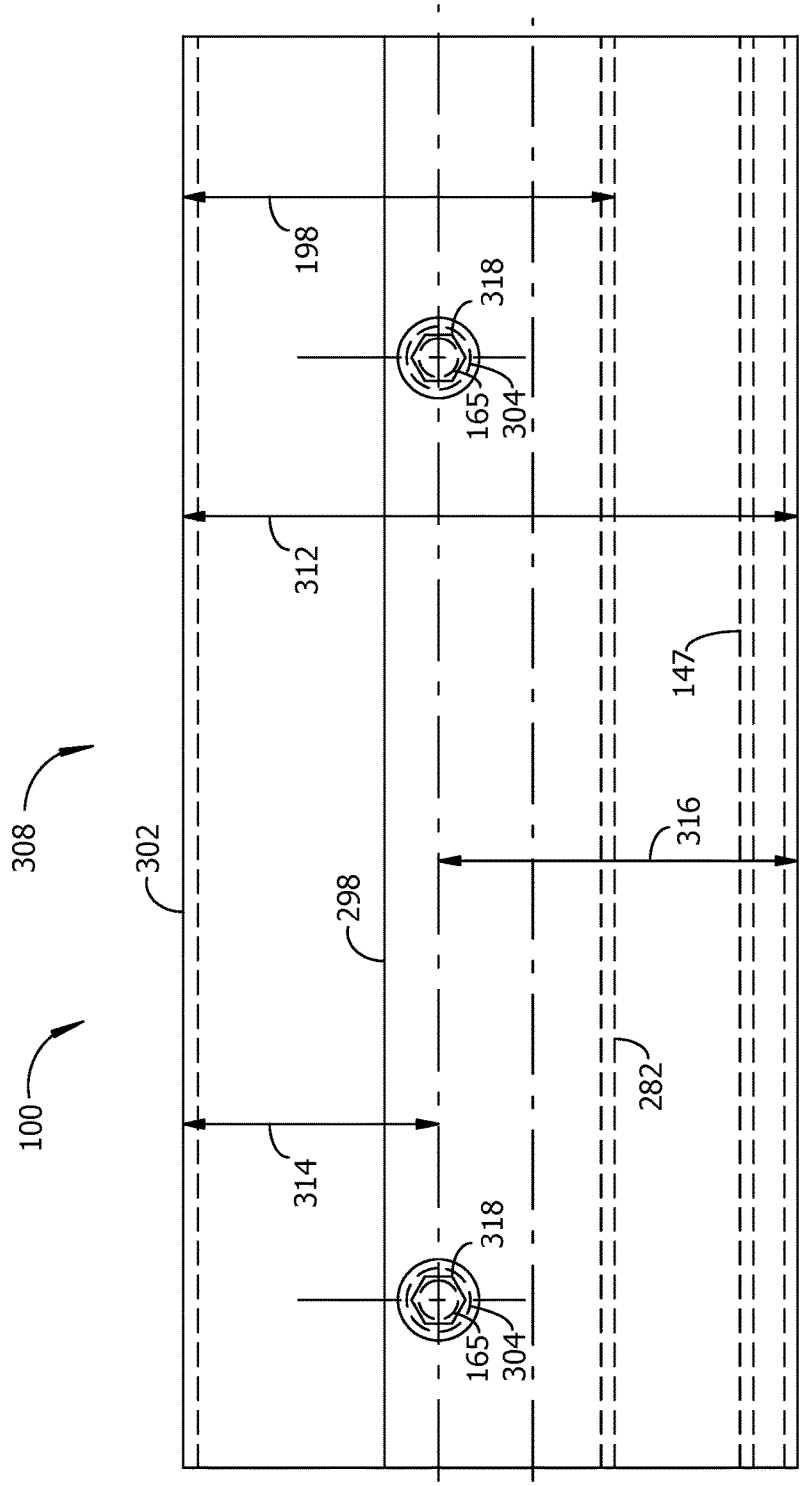
FIG. 26 is a view toward a side of the example of a beam assembly from FIG. 24.

The lower beam 298 receives the upper beam 302 with the open sides 122 of the two beams facing one another, enclosing a void space between the closed side of the upper beam and the closed side of the lower beam. The interior separation distance 124 between the first and second channel side walls (115, 130) of the lower beam 298 preferably matches the width across the flanges 283 of the upper beam 302 to establish a close fit between the upper and lower beams. The height 196 of the lower beam 298, the height 198 of the upper beam 302, and the separation distance 316 of the connector bars 304 joining the two beams together may be selected to give a desired profile height 312 for the beam assembly 308. FIG. 25 shows an example of a beam assembly 308 with a greater height dimension 198A for the upper beam 302 compared to the example of FIG. 24, giving a greater profile height 312A than the profile height in FIG. 24. Other dimensions may remain unchanged. Alternatively, the height 196 of the lower beam 298 may be modified and the height of the upper beam 302 left unchanged. The example beam assembly 308 from FIG. 25 may have greater resistance to longitudinal deflection under load, and possibly greater load capacity, than the beam assembly 308 from FIG. 24. FIG. 26 gives a side view of the heights of the upper beam, lower beam, and beam assembly 308. Although the flanged beam 296 is shown as the upper beam 302 in the example of FIG. 24, the entire beam assembly 308 may be rotated 180° with the flanged beam serving as the lower beam.

Figure 27:
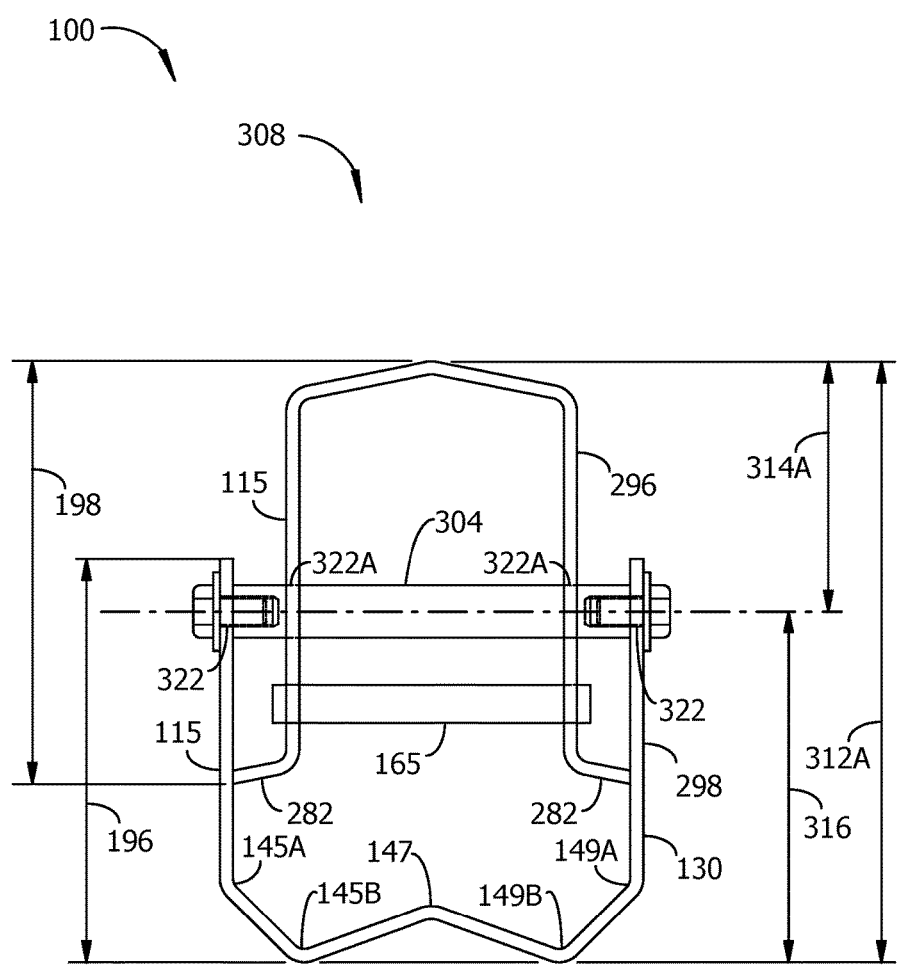
FIG. 27 is a view toward an end of an alternative embodiment of a beam assembly in which the upper beam has been repositioned compared to FIG. 24 to give a beam assembly with a lower profile height.
Figure 28:
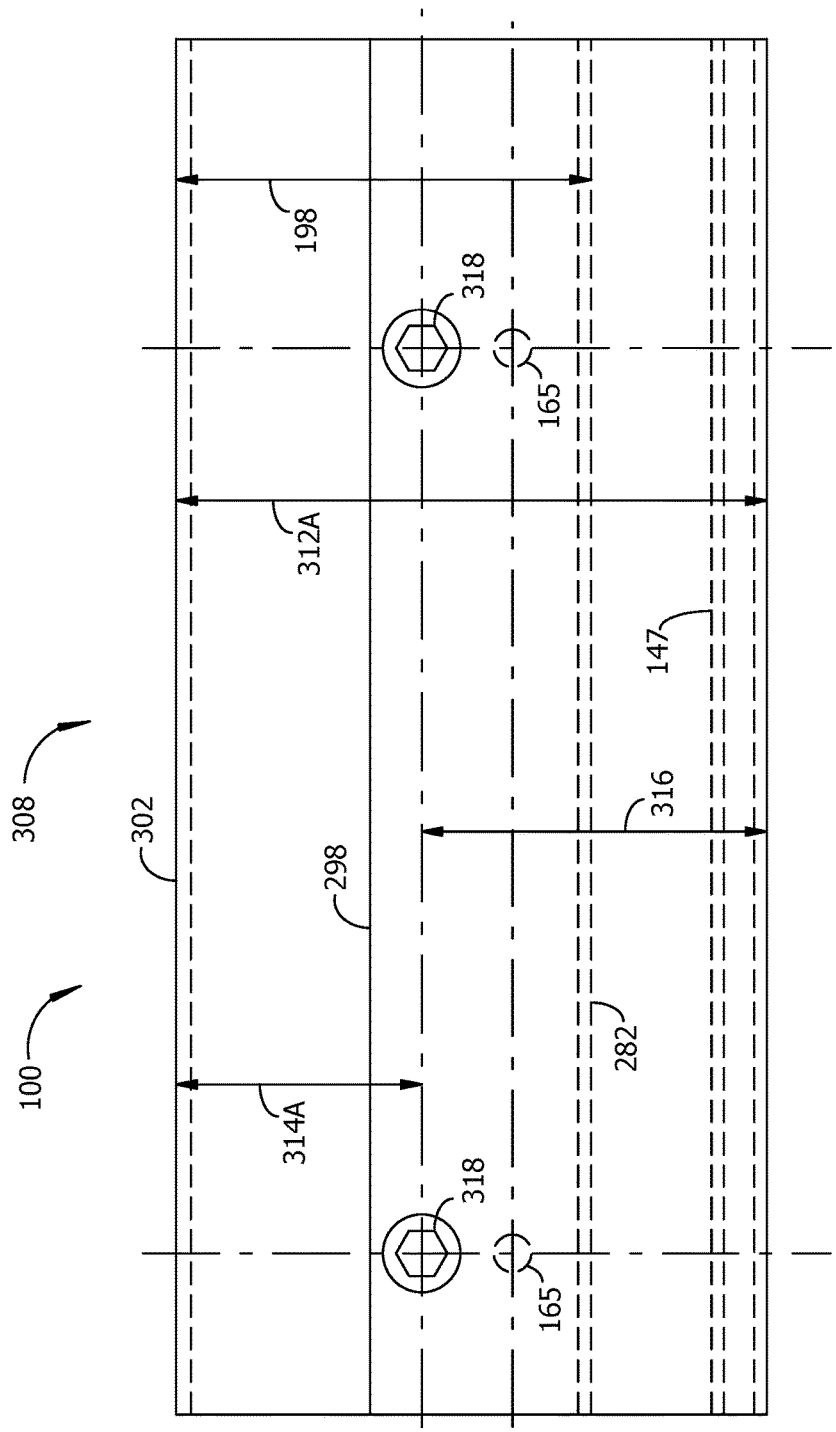
FIG. 28 is a view toward a side of the example of a beam assembly from FIG. 27.

Another example of a support beam assembly 308 with a configurable profile height 312 is shown in the example of FIG. 27. In the example of FIG. 25, the height of the upper beam, or alternatively the height of the lower beam, was modified to form a new beam assembly 308 with a selected profile height 312A. In the example of FIG. 27, the separation distance 314A from the top of the closed end 102A of the upper beam 302 to the connector bar 304 is less than the corresponding separation distance 314 in FIG. 24, decreasing the beam assembly profile height 312. The separation distance may be modified by repositioning through-holes 322 in the upper beam to hold the upper beam a selected distance inside the lower beam. FIG. 28 gives a side view of examples of the heights of the upper beam, lower beam, and beam assembly 308 for the example of FIG. 27.

For the examples of FIGS. 24-28, the flanged beam 296 may be arranged with the flanges 282 in sliding contact with the interior vertical sides of the first and second channel side walls (115, 130) of the lower beam 298. The spreader 165 attached to the first and second channel side walls (115, 130) of the upper beam 302 reduces deflections of the channel side walls on the upper beam when a load is applied to the beam assembly 308. The connector bar 304 attached to the channel side walls (115, 130) of the lower beam 298 passes through apertures 322 formed in the channel side walls of the upper beam, coupling the lower beam to the upper beam to form a rigid structure. The connector bar 304 may be attached to the lower beam 298 by welding or by threaded fasteners 318 engaging threaded apertures formed in the connector bar. The threaded fasteners 318 may optionally be used to join the beam assembly 308 to other beam assemblies or to other structures.

In some support beam embodiments 100, for example as shown in FIGS. 2, 6, 8, 12, 14, 15, 18, 21, 22, and 23, a longitudinal bend, for example the first longitudinal bend 145, may be made as a single bend having a constant curvature. In an alternative embodiment, the longitudinal bend may be formed as separate smaller bends as suggested by longitudinal bends 145A and 145B and longitudinal bends 149A and 149B in the example of FIG. 24 and FIG. 25.

Unless expressly stated otherwise herein, ordinary terms have their corresponding ordinary meanings within the respective contexts of their presentations, and ordinary terms of art have their corresponding regular meanings.

What is claimed is:

1. A support beam, comprising:
    a first side wall;
    a first self-draining wall joined to said first side wall at a first interior angle having a value in a range from ninety degrees (90°) to one hundred ten degrees (110°);
    a second self-draining wall joined to said first self-draining wall;
    a second side wall joined to said second self-draining wall at a second interior angle having a value in a range from ninety degrees (90°) to one hundred ten degrees) (110°), said second side wall parallel to said first side wall; and
    a plurality of a spreader, each of said spreader welded to said first side wall and to said second side wall;
    wherein:
        said first side wall, said first self-draining wall, said second self-draining wall, and said second side wall form a channel with an open side opposite said first and second self-draining walls;
        said spreaders are connected to one another only by said first side wall and said second side wall, with no other structure connecting any of said spreaders to one another, and with no other structure interposed between any of said spreaders and said first self-draining wall;
        said first self-draining wall is formed without any apertures; and
        said second self-draining wall is formed without any apertures.

2. The support beam of claim 1, wherein said first interior angle is approximately equal to one hundred ten degrees (110°).

3. The support beam of claim 1, wherein said second interior angle is approximately equal to one hundred ten degrees (110°).

4. The support beam of claim 1, wherein when in an installed position, said support beam is capable of being disposed with said first and second side walls parallel to a vertical reference, said first self-draining wall at an angle of approximately twenty degrees (20°) to a horizontal reference, and said second self-draining wall at an angle of approximately twenty degrees (20°) to the horizontal reference.

5. The support beam of claim 1, wherein said first self-draining wall and said first side wall are joined by a first longitudinal bend, said first self-draining wall and said second self-draining wall are joined by a second longitudinal bend, and said second self-draining wall and said second side wall are joined by a third longitudinal bend.

6. The support beam of claim 1, wherein said first self-draining wall and said second self-draining wall are joined by a first longitudinal weld, said first self-draining wall and said first side wall are joined by a second longitudinal weld, and said second self-draining wall and said second side wall are joined by a third longitudinal weld.

7. The support beam of claim 1, wherein each of said spreader is formed as a cylinder.

* * * * *